(12) United States Patent
Zhao

(10) Patent No.: US 9,477,361 B2
(45) Date of Patent: Oct. 25, 2016

(54) CAPACITIVE IN-CELL TOUCH PANEL, METHOD FOR MANUFACTURING THE SAME AND DISPLAY DEVICE

(71) Applicant: BOE TECHNOLOGY GROUP CO., LTD., Beijing (CN)

(72) Inventor: Lijun Zhao, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 30 days.

(21) Appl. No.: 14/415,100

(22) PCT Filed: Apr. 22, 2014

(86) PCT No.: PCT/CN2014/075873
§ 371 (c)(1),
(2) Date: Jan. 15, 2015

(87) PCT Pub. No.: WO2015/096315
PCT Pub. Date: Jul. 2, 2015

(65) Prior Publication Data
US 2016/0004346 A1    Jan. 7, 2016

(30) Foreign Application Priority Data
Dec. 27, 2013 (CN) .......................... 2013 1 0741360

(51) Int. Cl.
G06F 3/044 (2006.01)
G06F 3/041 (2006.01)
G02F 1/1343 (2006.01)

(52) U.S. Cl.
CPC ............. G06F 3/044 (2013.01); G06F 3/0412 (2013.01); *G02F 2001/134318* (2013.01); *G06F 2203/04103* (2013.01)

(58) Field of Classification Search
CPC ................... G06F 2203/04103; G06F 3/0412; G06F 3/044; G02F 1/13338; G09G 2300/0426; G09G 3/3648; G09G 3/36
See application file for complete search history.

(56) References Cited

U.S. PATENT DOCUMENTS

| 2006/0176266 A1* | 8/2006 | Pak | G02F 1/13338 345/104 |
| 2007/0013819 A1* | 1/2007 | Pak | G02F 1/133512 349/12 |
| 2008/0048989 A1* | 2/2008 | Yoon | G02F 1/13338 345/173 |

(Continued)

FOREIGN PATENT DOCUMENTS

| CN | 101625491 A | 1/2010 |
| CN | 102955636 A | 3/2013 |

(Continued)

OTHER PUBLICATIONS

Office Action in Chinese Patent Application No. 201310741360.2, dated Dec. 30, 2015.

(Continued)

*Primary Examiner* — Sanjiv D Patel
(74) *Attorney, Agent, or Firm* — Bakerhostetler LLP

(57) ABSTRACT

The present disclosure provides a capacitive in-cell touch panel, its manufacturing method and a display device. The capacitive in-cell touch panel includes a plurality of gate scanning lines and a plurality of data lines arranged perpendicular to each other; a plurality of common electrodes, to which a common electrode signal is applied during a display period and a touch scanning signal is applied during a touch period, so that the common electrodes are also used as touch driving electrodes; and a plurality of touch sensing electrodes arranged at a layer identical to the data lines and at a region corresponding to the gate scanning lines, the touch sensing electrodes outputting a touch sensing signal during the touch period, wherein the touch driving electrodes and the touch sensing electrodes are arranged in a crisscross manner and insulated from each other.

14 Claims, 2 Drawing Sheets

(56) References Cited

U.S. PATENT DOCUMENTS

| | | | |
|---|---|---|---|
| 2008/0278458 A1* | 11/2008 | Masuzawa | G02F 1/13338 345/174 |
| 2009/0174681 A1* | 7/2009 | Chang | G06F 3/0412 345/173 |
| 2009/0295692 A1* | 12/2009 | Lee | G02F 1/13338 345/87 |
| 2011/0074712 A1* | 3/2011 | Bak | G06F 3/0416 345/173 |
| 2012/0274603 A1* | 11/2012 | Kim | G06F 3/0412 345/174 |
| 2013/0234739 A1* | 9/2013 | Deng | G01R 27/2605 324/686 |
| 2013/0257794 A1* | 10/2013 | Lee | G06F 3/041 345/174 |
| 2014/0000944 A1* | 1/2014 | Tanabe | H05K 1/0274 174/255 |
| 2014/0111476 A1* | 4/2014 | You | G09G 3/3655 345/174 |
| 2014/0204055 A1* | 7/2014 | Lu | G06F 3/0412 345/174 |

FOREIGN PATENT DOCUMENTS

| | | |
|---|---|---|
| CN | 103105989 A | 5/2013 |
| CN | 103280448 A | 9/2013 |
| CN | 103293737 A | 9/2013 |
| CN | 103309534 A | 9/2013 |
| CN | 203178630 U | 9/2013 |
| CN | 203217537 U | 9/2013 |
| CN | 103472965 A | 12/2013 |
| CN | 103699284 A | 4/2014 |

OTHER PUBLICATIONS

International Search Report and Written Opinion in PCT International Application No. PCT/CN2014/075873, dated Sep. 24, 2014.

* cited by examiner

CAPACITIVE IN-CELL TOUCH PANEL, METHOD FOR MANUFACTURING THE SAME AND DISPLAY DEVICE

CROSS-REFERENCE TO RELATED APPLICATION

This application is the U.S. national phase of PCT Application No. PCT/CN2014/075873 filed on Apr. 22, 2014, which claims a priority of the Chinese patent application No. 201310741360.2 filed on Dec. 27, 2013, which is incorporated herein by reference in its entirety.

TECHNICAL FIELD

The present disclosure relates to the field of display technology, in particular to a capacitive in-cell touch panel, a method for manufacturing the same and a display device.

BACKGROUND

Along with the rapid development of display technology, touch panel has been widely used in our daily lives. Currently, the touch panel may include, on the basis of its constitution and structure, an add-on mode touch panel, an on-cell touch panel and an in-cell touch panel. For the add-on mode touch panel, it is produced independently of a liquid crystal display (LCD) and then adhered thereto, so it has such drawbacks as high manufacturing cost, low light transmittance and a thick module. For the in-cell touch panel, its touch electrode is built in the LCD to reduce the thickness of the entire module and significantly reduce the manufacturing cost of the touch panel, so this kind of touch panel is favored by many manufacturers.

Recently, an existing capacitive in-cell touch panel is obtained by forming two layers of crisscross, transparent conductive electrodes, usually bar-like indium tin oxide (ITO) electrodes, on a surface of a thin film transistor (TFT) array substrate as touch driving electrodes and touch sensing electrodes, respectively, and an inductive capacitance is formed at a junction of two ITO electrodes. Such a touch panel operates as follows. When a touch scanning signal is applied to the touch driving electrode, a touch sensing signal coupled by the touch sensing electrode through the inductive capacitance is detected, and at this time, an electric field of a human body acts on the inductive capacitance if the touch panel is touched by the human body, so as to change a value of the inductive capacitance, thereby to change the touch sensing signal coupled by the touch sensing electrode. Then, a touch position may be determined in accordance with the change of the touch sensing signal.

For the design of the above-mentioned capacitive in-cell touch panel, it is required to add a new membrane on the existing TFT array substrate, resulting in an increase in a thickness of the touch panel. In addition, an additional process step is required when manufacturing the TFT array substrate, so the production cost will increase and the production efficiency will be lowered.

SUMMARY

An object of the present disclosure is to provide a capacitive in-cell touch panel, its manufacturing method and a display device, so as to reduce a thickness of an existing capacitive in-cell touch panel and reduce the production cost.

In one aspect, the present disclosure provides a capacitive in-cell touch panel, including:
a plurality of gate scanning lines and a plurality of data lines arranged perpendicular to each other;
a TFT and a pixel electrode arranged at a pixel region defined by the adjacent gate scanning lines and the adjacent data lines;
a plurality of common electrodes, to which a common electrode signal is applied during a display period and a touch scanning signal is applied during a touch period, so that the common electrodes are also used as touch driving electrodes; and
a plurality of touch sensing electrodes arranged at a layer identical to the data lines and at regions corresponding to the gate scanning lines, the touch sensing electrodes outputting a touch sensing signal during the touch period,
wherein the touch driving electrodes and the touch sensing electrodes are arranged in a crisscross manner and insulated from each other.

Alternatively, the touch sensing electrode is arranged perpendicular to the data line and broken at a junction with the data line, the broken parts are bridged together through a first transparent electrode which is formed together with the pixel electrode simultaneously.

Alternatively, the capacitive in-cell touch panel further includes:
a plurality of metal driving electrodes arranged at a layer identical to the gate scanning lines and at regions corresponding to the data lines, and connected to corresponding common electrodes arranged thereabove.

Alternatively, the metal driving electrode is arranged at a layer identical to the gate scanning line and perpendicular to the gate scanning line and broken at a junction with the gate scanning line, and the broken parts are bridged together through a second transparent electrode which is formed together with the common electrode simultaneously.

Alternatively, the capacitive in-cell touch panel specifically includes in turn:
a substrate;
the gate scanning lines, gate electrodes of the TFTs and the metal driving electrodes;
a gate insulating layer;
the common electrodes connected to the metal driving electrodes through via-holes in the gate insulating layer;
an insulating layer;
an active layer of the TFTs;
the data lines, source electrodes and drain electrodes of the TFTs, and the touch sensing electrodes;
a protection layer; and
the pixel electrodes,
wherein the metal driving electrode and the gate scanning line are arranged at an identical layer in a crisscross manner, the metal driving electrode is broken at the junction with the gate scanning line, and the broken parts are bridged together through the second transparent electrode which is formed together with the common electrode simultaneously, and
wherein the touch sensing electrode and the data line are arranged at an identical layer in a crisscross manner, the touch sensing electrode is broken at the junction with the data line, and the broken parts are bridged together through the first transparent electrode which is formed together with the pixel electrode simultaneously.

In another aspect, the present disclosure provides a display device including the above-mentioned capacitive in-cell touch panel.

In yet another aspect, the present disclosure provides a method for manufacturing a capacitive in-cell touch panel, including:

a step of forming gate scanning lines;

a step of forming data lines and touch sensing electrodes, the touch sensing electrodes and the data lines being arranged at an identical layer, the touch sensing electrodes being formed at regions corresponding to the gate scanning lines, the touch sensing electrodes outputting a touch sensing signal during a touch period; and a step of forming common electrodes, to which a common electrode signal is applied during a display period and a touch scanning signal is applied during the touch period so that the common electrodes are also used as touch driving electrodes, wherein the touch driving electrode and the touch sensing electrode are arranged in a crisscross manner and insulated from each other.

Alternatively, the method further includes:

a step of forming a pixel electrode and a first transparent electrode, the pixel electrode being arranged at a pixel region defined by the adjacent gate scanning lines and the adjacent data lines, the touch sensing electrode and the data line being arranged at an identical layer and perpendicular to each other, the touch sensing electrode being broken at a junction with the data line, and the broken parts being bridged together through the first transparent electrode.

Alternatively, a metal driving electrode is formed while forming the gate scanning line, and the metal driving electrode is arranged at a layer identical to the gate scanning line and at a region corresponding to the data line, and connected to the corresponding common electrode thereabove.

Alternatively, a second transparent electrode is formed while forming the common electrode, the metal driving electrode is arranged perpendicular to the gate scanning line and broken at a junction with the gate scanning line, and the broken parts are bridged together through the second transparent electrode.

Alternatively, the method specifically includes:

providing a substrate;

forming the gate scanning lines, gate electrodes of TFTs and the metal driving electrodes on the substrate;

forming a gate insulating layer on the substrate with the gate scanning lines, the gate electrodes of the TFTs and the metal driving electrodes;

forming the common electrodes and the second transparent electrodes on the substrate with the gate insulating layer, the common electrode being connected to the metal driving electrode through a via-hole in the gate insulating layer, the metal driving electrode and the gate scanning line being arranged in a crisscross manner, the meal driving electrode being broken at the junction with the gate scanning line, and the broken parts being bridged together through the second transparent electrode;

forming an insulating layer on the substrate with the common electrodes;

forming an active layer of the TFTs on the substrate with the insulating layer;

forming the data lines, source electrodes and drain electrodes of the TFTs, and the touch sensing electrodes on the substrate with the active layer;

forming a protection layer on the substrate with the data lines, the source electrodes and the drain electrodes of the TFTs, and the touch sensing electrodes; and forming the pixel electrodes and the first transparent electrodes on the substrate with the protection layer, the touch sensing electrode and the data line being arranged in a crisscross manner, the touch sensing electrode being broken at the junction with the data line, and the broken parts being bridged together through the first transparent electrode.

The present disclosure has the following advantageous effects. According to the present disclosure, the common electrode is also used as the touch driving electrode, and the touch sensing electrode and the data line are arranged at the same layer and formed simultaneously by a single patterning process, so the touch panel can be manufactured without any additional processes for manufacturing the touch driving electrode and the touch sensing electrode. As a result, it is able to reduce the production cost and improve the production efficiency. Moreover, the touch function and the display function are driven in a time-division manner, so it is able to reduce mutual interference as well as to improve the image quality and touch accuracy.

DETAILED DESCRIPTION

Figure 1:
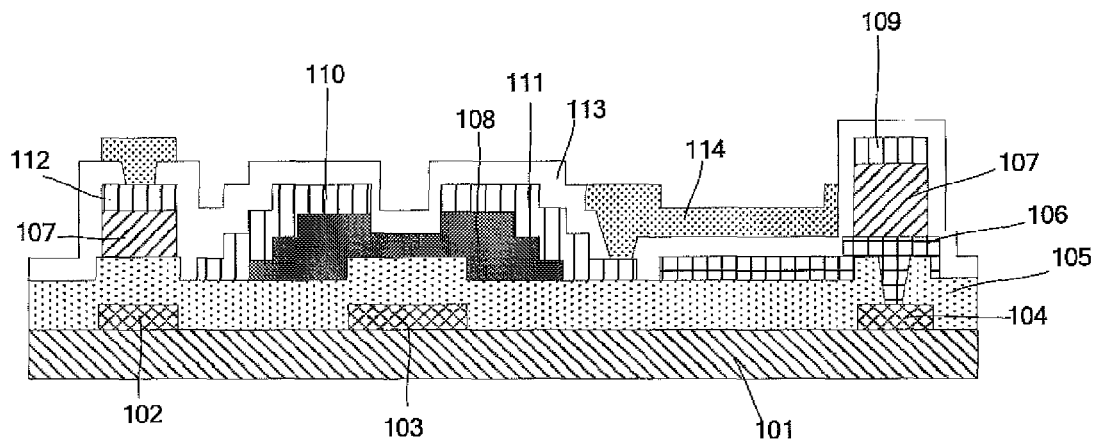
FIG. 1 is a schematic view showing a capacitive in-cell touch panel according to one embodiment of the present disclosure.

In order to make the objects, the technical solutions and the advantages of the present disclosure more apparent, the present disclosure will be described hereinafter in conjunction with the drawings and the embodiments.

A capacitive in-cell touch panel of the present disclosure includes:

a plurality of gate scanning lines and data lines arranged perpendicular to each other and defining a plurality of pixel regions;

a TFT and a pixel electrode arranged at each pixel region;

a plurality of common electrodes arranged at regions corresponding to the data lines, a common electrode signal being applied to the common electrodes during a display period and a touch scanning signal being applied to the common electrodes during a touch period so that the common electrodes are also used as touch driving electrodes; and a plurality of touch sensing electrodes arranged at a layer identical to the data lines and at regions corresponding to the gate scanning lines, the touch sensing electrodes outputting a touch sensing signal during the touch period, wherein the touch driving electrodes and the touch sensing electrodes are arranged in a crisscross manner and insulated from each other.

The touch panel will be described hereinafter with reference to FIG. 1.

In the capacitive in-cell touch panel of this embodiment, the display function and touch function are driven in a time-division manner, i.e., a frame is divided into a display period and a touch period. Within the display period, the common electrode signal is applied to the common electrode 106 as an ordinary common electrode, and a pixel signal is applied to the pixel electrode 114 so as to cooperate with the common electrode 106 to display an image. Within the touch period, the common electrode 106 is also used as the touch driving electrode to which the touch scanning signal is applied, and the touch sensing electrode 112 couples the touch scanning signal and then outputs it.

Because the common electrode 106 is also used as the touch driving electrode and the touch sensing electrode 112 is arranged at an identical layer to the data line 109, the touch sensing electrode 112 and the data line 109 may be formed simultaneously by a single patterning process, and the touch panel may be manufactured without any additional process desired for manufacturing the touch driving electrode and the touch sensing electrode. As a result, it is able to reduce the production cost and improve the production efficiency. Moreover, the touch function and the display function are driven in a time-division manner, so it is also able to reduce the mutual interference as well as to improve the image quality and the touch accuracy.

Further, the touch sensing electrode 112 and the data line 109 at the same layer may be arranged perpendicular to each other, and at this time, they will certainly intersect each other. In this embodiment, the touch sensing electrode 112 is broken at a junction with the data line 109, and the broken parts are bridged together through a first transparent electrode so as to cross the data line 109, thereby to prevent the data line from being short-circuited. The first transparent electrode is formed together with the pixel electrode 114 simultaneously, and the touch sensing electrode 112 is arranged at a region corresponding to the gate scanning line 102, i.e., arranged above the gate scanning line 102. Further, the common electrode 106 of this embodiment may be arranged above the gate scanning line 102 and below the data line 109. Due to better conductivity of a metal, the capacitive in-cell touch panel of this embodiment is further provided with a plurality of metal driving electrodes 104, so as to reduce a resistance of the common electrode serving as the touch driving electrode, thereby to reduce the time delay for signals. The metal driving electrodes 104 are arranged at a layer identical to the gate scanning line 102, so they may be formed together with the gate scanning line by a single patterning process. Moreover, in order not to adversely affect a display effect, the metal driving electrode 104 is arranged at a region corresponding to the data line 109, i.e., arranged below the data line 109, and connected to the corresponding common electrode 106 thereabove through a via-hole in a gate insulating layer 105. Because the metal driving electrode 104 and the gate scanning line 102 are formed by a single patterning process, no additional process for manufacturing the metal driving electrode is required, so it is able to further reduce the production cost and improve the production efficiency while reducing the time delay for signals.

Further, the metal driving electrode 104 and the gate scanning line 102 at the same layer may be arranged perpendicular to each other, and at this time they will certainly intersect each other. In this embodiment, the metal driving electrode 104 is broken at a junction with the gate insulating layer 102, and the broken parts are bridged together through a second transparent electrode, so as to cross the gate scanning line 102, thereby to prevent the gate scanning line from being short-circuited. The second transparent electrode and the common electrode 106 are formed simultaneously.

The above contents may be shown in FIG. 1 in a clearer manner. Referring to FIG. 1, which is a schematic view showing the capacitive in-cell touch panel of the present disclosure, the capacitive in-cell touch panel includes in turn:

a substrate 101;
the gate scanning lines 102, a gate electrode 103 of the TFT and the metal driving electrode 104;
the gate insulating layer 105;
the common electrodes 106 connected to the metal driving electrodes 104 through the via-holes in the gate insulating layer 105;
an insulating layer 107;
an active layer 108 of the TFT:
the data lines 109, a source electrode 110 and a drain electrode 111 of the TFT, and the touch sensing electrodes 112, the touch sensing electrodes 112 and the common electrodes 106 being arranged in a crisscross manner and insulated from each other;
a protection layer 113; and
the pixel electrodes 114.

The substrate 101 may be a base substrate, or a substrate with patterns.

The gate scanning lines 102, the gate electrode 103 of the TFT and the metal driving electrodes 104 are formed at the same layer by a single patterning process, and the metal driving electrodes 104 are arranged perpendicular to the gate scanning lines 102. The gate insulating layer 105 is arranged above the metal driving electrodes 104, the gate electrode 103 of the TFT and the metal driving electrodes 104. The via-holes are formed in the gate insulating layer 105 at positions above the metal driving electrodes 104, and meanwhile the via-holes (not shown) are formed in the gate insulating layer 105 at positions corresponding to the junctions of the metal driving electrodes 104 and the gate scanning lines 102.

The data lines 109, the source electrode 110 and the drain electrode 111 of the TFT and the touch sensing electrodes 112 are formed by a single patterning process, and arranged at the same layer. The data lines 109 are arranged perpendicular to the touch sensing electrodes 112. The touch sensing electrode 112 is broken at the junction with the data line 109, and the broken parts are bridged together through the first transparent electrode which is formed together with the pixel electrode 114 simultaneously, so as to cross the data line 109, thereby to prevent the data line 109 from being short-circuited.

The protection layer 113 is arranged above the data lines 109, and the source electrode 110 and the drain electrode 111 of the TFT, and provided with a via-hole at a position corresponding to the junction of the data line 109 and the touch sensing electrode 112. In addition, the protection layer 113 is further provided with a via-hole at a position above the drain electrode 111 of the TFT, through which the pixel electrode 114 and the drain electrode 111 of the TFT are connected.

Figure 2:
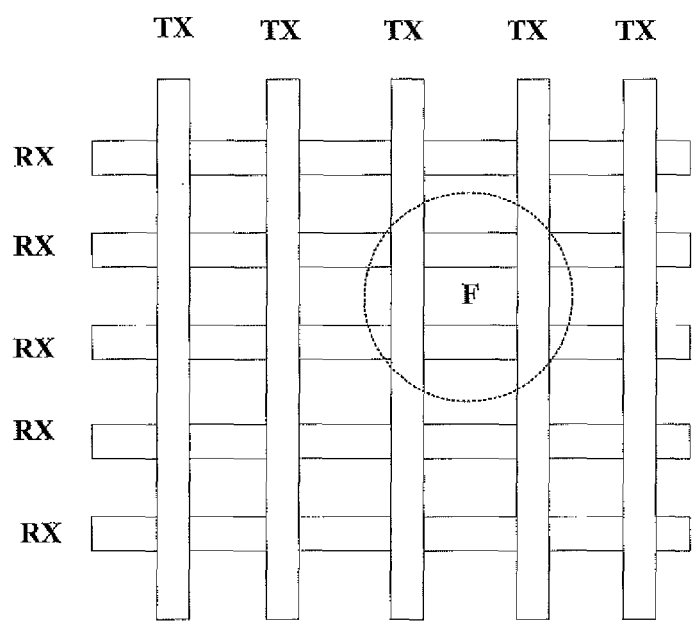
FIG. 2 is a planar view of touch driving electrodes and touch sensing electrodes according to one embodiment of the present disclosure.
Figure 3:
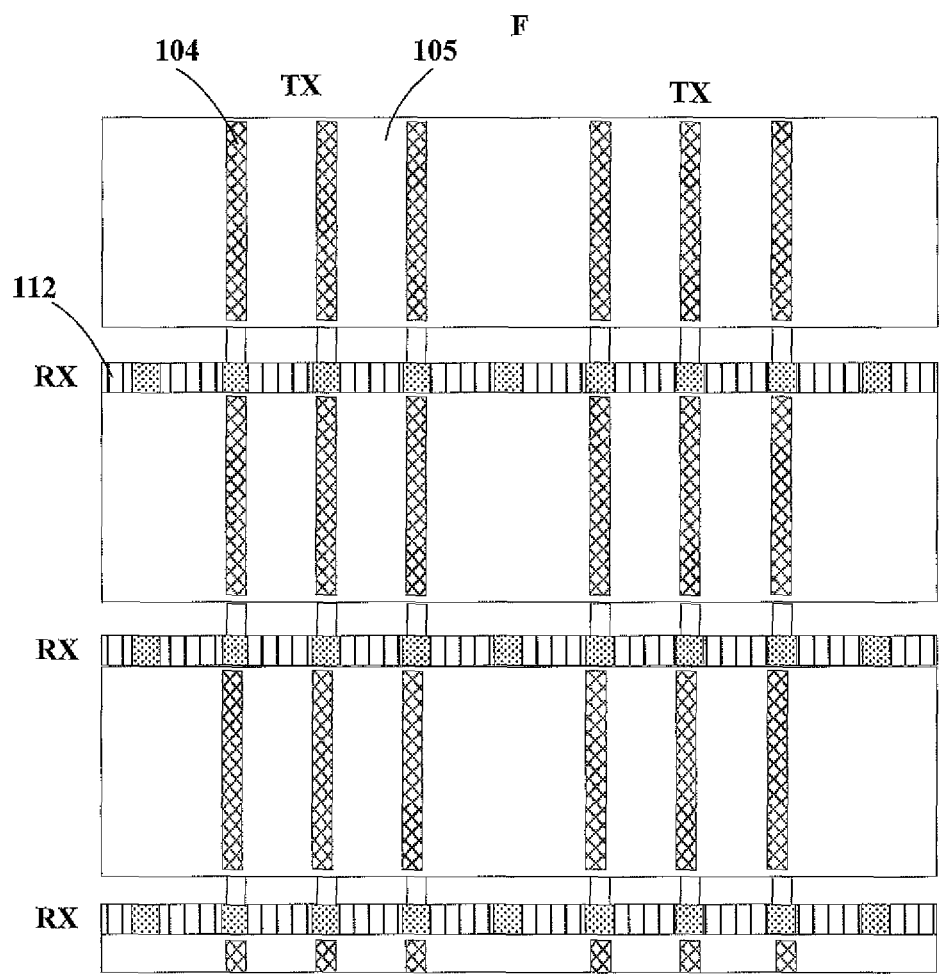
FIG. 3 is a partial enlarged view of region F in FIG. 2.

The arrangement of the metal driving electrodes 104 and the gate scanning lines 102 perpendicular to each other and the arrangement of the touch sensing electrodes 112 and the data lines 109 perpendicular to each other will be described hereinafter with reference to FIG. 2, which is a planar view showing the touch driving electrodes 104 (TX) and the touch sensing electrodes 112 (RX), and FIG. 3, which is partial enlarged view of region F in FIG. 2. In FIGS. 2 and 3, the touch driving electrode TX is implemented with the common electrode 106, and as mentioned above, the metal driving electrode 104 is connected to the common electrode 106, so the touch driving electrode TX may also be equally considered as the metal driving electrode 104. The metal driving electrode 104 is not arranged at a layer identical to the touch sensing electrode 112, but arranged at a layer identical to the gate scanning line 102 corresponding to the touch sensing electrode 112. The metal driving electrode 104 is broken at the junction with the gate scanning line 102, and the broken parts are bridged together through the second transparent electrode so as to cross the gate scanning line 104. The touch sensing electrode RX (112) is arranged at a layer identical to the data line (not shown) and broken at the junction with the data line, and the broken parts are bridged together through the first transparent electrode.

The present disclosure further provides a display device including the above-mentioned capacitive in-cell touch panel. The display device may be any product or member having a display function, such as a liquid crystal display panel, an electronic paper, an OLED panel, a mobile phone, a flat panel PC, a TV, a display, a laptop PC, a digital photo frame and a navigator.

The present disclosure further provides a method for manufacturing a capacitive in-cell touch panel, including:

a step of forming gate scanning lines;

a step of forming data lines and touch sensing electrodes, the touch sensing electrodes and the data lines being arranged at an identical layer, the touch sensing electrodes being arranged at regions corresponding to the gate scanning lines, and the touch sensing electrodes outputting a touch sensing signal during a touch period; and a step of forming common electrodes, to which a common electrode signal is applied during a display period and a touch scanning signal is applied during the touch period so that the common electrodes are also used as touch driving electrodes, wherein the touch driving electrode and the touch sensing electrode are arranged in a crisscross manner and insulated from each other.

Alternatively, the common electrode is arranged at a region corresponding to the data line.

Because the common electrode is also used as the touch driving electrode and the touch sensing electrode is arranged at a layer identical to the data line, the touch sensing electrode and the data line may be formed by a single patterning process, and the touch panel may be manufactured without any additional processes desired for manufacturing the touch driving electrode and the touch sensing electrode. As a result, it is able to reduce the production cost and improve the production efficiency. Moreover, the touch function and the display function are driven in a time-division manner, so it is also able to reduce the mutual interference as well as to improve the image quality and the touch accuracy.

Further, the touch sensing electrode and the data line are arranged at an identical layer and perpendicular to each other. The touch sensing electrode is broken at a junction with the data line, and the broken parts are bridged together through a first transparent electrode, so as to cross the data line, thereby to prevent the data line from being short-circuited. Subsequent to the step of forming the data lines and the touch sensing electrodes, the method further includes:

a step of forming a pixel electrode and a first transparent electrode, the pixel electrode being arranged at a pixel region defined by the adjacent gate scanning lines and the adjacent data lines.

Further, in order to reduce a resistance of the common electrode as the touch driving electrode and reduce the time delay for signals, in this embodiment, a metal driving electrode is formed while forming the gate scanning line, so that the metal driving electrode is arranged at a layer identical to the gate scanning line and at a region corresponding to the data line, and connected to the corresponding common electrode thereabove.

The metal driving electrode is arranged perpendicular to and insulated from the gate scanning line, and broken at a junction with the gate scanning line. The broken parts are bridged together through a second transparent electrode, so as to cross the gate scanning line, thereby to prevent the gate scanning line from being short-circuited. The second transparent electrode and the common electrode are formed simultaneously.

By taking the capacitive in-cell touch panel in FIG. 1 as an example, the method for manufacturing the capacitive in-cell touch panel in this embodiment will be described hereinafter.

Step S21: providing the substrate 101. The substrate 101 may be a base substrate, or a substrate with patterns.

Step S22: forming the gate scanning lines 102, the gate electrode 103 of the TFT and the metal driving electrodes 104 on the substrate 101. To be specific, a first metal layer is formed on the substrate 101 and then patterned using a photolithography process, so as to form the gate scanning lines 102, the gate electrode 103 of the TFT and the metal driving electrodes 104. The metal driving electrode 104 is arranged perpendicular to the gate scanning line 102, and broken at the junction with the gate scanning line 102. In addition, in order not to adversely affect the display effect, the metal driving electrode 104 is arranged at a region corresponding to the subsequently-formed data line, i.e., arranged below the subsequently-formed data line.

Step S23: forming the gate insulating layer 105 on the substrate 101 with the gate scanning lines 102, the gate electrode 103 of the TFT and the metal driving electrodes 104, and forming via-holes in the gate insulating layer 105 at positions above the metal driving electrodes 104.

Step S24: forming the common electrodes 106 and the second transparent electrodes on the substrate with the gate insulating layer 105. The common electrode signal is applied to the common electrode 106 within the display period and the touch scanning signal is applied to the common electrode 106 within the touch period, so that the common electrode 106 is also used as the touch driving electrode. The metal driving electrode 104 is arranged perpendicular to the gate scanning line 102, and broken at the junction with the gate scanning line 102. The broken parts are bridged together through the second transparent electrode. To be specific, the common electrode 106 is arranged above the metal driving electrode 104 and connected thereto through the via-hole in the gate insulating layer 105, so as to reduce the resistance of the common electrode 106.

Step S25: forming the insulating layer 107 on the substrate 101 with the common electrode 106.

Step S26: forming the active layer 108 of the TFT on the substrate 101 with the insulating layer 107. To be specific, an a-Si layer or a lightly-doped a-Si layer may be formed on the substrate 101 with the common electrode 106 and then patterned using a photolithography process so as to form the active layer 108. The active layer 108 is arranged above the gate electrode 103 of the TFT.

Step S27: forming the data lines 109, the source electrode 110 and the drain electrode 111 of the TFT and the touch sensing electrodes 112 on the substrate 101 with the active layer 108. The touch sensing electrode 112 and the common electrodes 106 are arranged in a crisscross manner and insulated from each other, and the touch sensing electrode 112 outputs the touch sensing signal within the touch period. In order not to adversely affect the display effect, the touch sensing electrode 112 is arranged at a region corresponding to the gate scanning line 102, i.e., arranged above the gate scanning line 102. To be specific, a second metal layer may be formed on the substrate 101 with the active layer 108 and then patterned using a photolithography process so as to form the data lines 109, the source electrode 110 and the drain electrode 111 of the TFT and the touch sensing electrodes 112. The touch sensing electrode 112 is arranged perpendicular to the data line 109, and broken at the junction with the data line 109. The data line 109 is arranged above the common electrode 106, and the insulating layer 107 is arranged therebetween. The touch sensing electrode 112 is arranged above the gate scanning line 102, and the insulating layer 107 is also arranged therebetween.

Step S28: forming the protection layer 113 on the substrate 101 with the data lines 109, the source electrode 110 and the drain electrode 111 of the TFT and the touch sensing electrodes 112, and forming the via-holes in the protection layer 113 at junctions of the data lines 109 and the touch sensing electrodes 112.

Step S29: forming the pixel electrodes 114 and the first transparent electrodes on the substrate 101 with the protection layer 113. The reserved first transparent electrode above the touch sensing electrode 112 is connected to the touch sensing electrode 112 through the via-hole in the protection layer 113 so as to enable the touch sensing electrode 112 to cross the data line 109, thereby to prevent the data line 109 from being short-circuited.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A capacitive in-cell touch panel, comprising:
a plurality of gate scanning lines and a plurality of data lines arranged perpendicular to each other;
a TFT and a pixel electrode arranged at a pixel region defined by the adjacent gate scanning lines and the adjacent data lines;
a plurality of common electrodes, to which a common electrode signal is applied during a display period and a touch scanning signal is applied during a touch period, so that the common electrodes are also used as touch driving electrodes; and
a plurality of touch sensing electrodes arranged at a layer identical to the data lines and at a region corresponding to the gate scanning lines, the touch sensing electrodes outputting a touch sensing signal during the touch period,
wherein the touch driving electrodes and the touch sensing electrodes are arranged in a crisscross manner and insulated from each other; and
wherein the touch sensing electrode is arranged perpendicular to the data line and broken at a junction with the data line, and the broken parts are bridged together through a pixel electrode material which is formed together with the pixel electrode simultaneously.

2. The capacitive in-cell touch panel according to claim 1, further comprising:
a plurality of metal driving electrodes arranged at a layer identical to the gate scanning lines and at regions corresponding to the data lines, and connected to corresponding common electrodes arranged above the plurality of metal driving electrodes.

3. The capacitive in-cell touch panel according to claim 2, wherein the metal driving electrode is arranged perpendicular to the gate scanning line and broken at a junction with the gate scanning line, and the broken parts are bridged together through a second transparent electrode.

4. The capacitive in-cell touch panel according to claim 3, wherein the second transparent electrode and the common electrode are formed simultaneously.

5. The capacitive in-cell touch panel according to claim 1, comprising in turn:
a substrate;
the gate scanning lines, gate electrodes of the TFTs and the metal driving electrodes;
a gate insulating layer;
the common electrodes connected to the metal driving electrodes through via-holes in the gate insulating layer;
an insulating layer;
an active layer of the TFTs;
the data lines, source electrodes and drain electrodes of the TFTs, and the touch sensing electrodes;
a protection layer; and
the pixel electrodes,
wherein the metal driving electrode and the gate scanning line are arranged at an identical layer in a crisscross manner, the metal driving electrode is broken at the junction with the gate scanning line, and the broken parts are bridged together through the second transparent electrode which is formed together with the common electrode simultaneously, and
wherein the touch sensing electrode and the data line are arranged at an identical layer in a crisscross manner, the touch sensing electrode is broken at the junction with the data line, and the broken parts are bridged together through the pixel electrode material which is formed together with the pixel electrode simultaneously.

6. A display device comprising the capacitive in-cell touch panel according to claim 1.

7. The display device according to claim 6, further comprising:
a plurality of metal driving electrodes arranged at a layer identical to the gate scanning lines and at regions corresponding to the data lines, and connected to corresponding common electrodes arranged above the plurality of metal driving electrodes.

8. The display device according to claim 7, wherein the metal driving electrode is arranged perpendicular to the gate scanning line and broken at a junction with the gate scanning line, and the broken parts are bridged together through a second transparent electrode.

9. The display device according to claim 8, wherein the second transparent electrode and the common electrode are formed simultaneously.

10. The display device according to claim 6, comprising in turn:
a substrate;
the gate scanning lines, gate electrodes of the TFTs and the metal driving electrodes;
a gate insulating layer;
the common electrodes connected to the metal driving electrodes through via-holes in the gate insulating layer;
an insulating layer;
an active layer of the TFTs;
the data lines, source electrodes and drain electrodes of the TFTs, and the touch sensing electrodes;
a protection layer; and the pixel electrodes, wherein the metal driving electrode and the gate scanning line are arranged at an identical layer in a crisscross manner, the metal driving electrode is broken at the junction with the gate scanning line, and the broken parts are bridged together through the second transparent electrode which is formed together with the common electrode simultaneously, and wherein the touch sensing electrode and the data line are arranged at an identical layer in a crisscross manner, the touch sensing electrode is broken at the junction with the data line, and the broken parts are bridged together through the pixel electrode material which is formed together with the pixel electrode simultaneously.

11. A method for manufacturing a capacitive in-cell touch panel, comprising:

a step of forming gate scanning lines;

a step of forming data lines and touch sensing electrodes, the touch sensing electrodes and the data lines being arranged at an identical layer, the touch sensing electrodes being arranged at regions corresponding to the gate scanning lines, and the touch sensing electrodes outputting a touch sensing signal during a touch period;

a step of forming common electrodes, to which a common electrode signal is applied during a display period and a touch scanning signal is applied during the touch period so that the common electrodes are also used as touch driving electrodes; and a step of forming a pixel electrode and a pixel electrode material simultaneously, the pixel electrode being arranged at a pixel region defined by the adjacent gate scanning lines and the adjacent data lines, the touch sensing electrode and the data line being arranged perpendicular to each other, the touch sensing electrode being broken at a junction with the data line, and the broken parts being bridged together through the pixel electrode material, wherein the touch driving electrode and the touch sensing electrode are arranged in a crisscross manner and insulated from each other.

12. The method according to claim 11, wherein a metal driving electrode is formed while forming the gate scanning line, and the metal driving electrode is arranged at a layer identical to the gate scanning line and at a region corresponding to the data line, and connected to the corresponding common electrode above the metal driving electrode.

13. The method according to claim 12, wherein a second transparent electrode is formed while forming the common electrode, the metal driving electrode is arranged perpendicular to the gate scanning line and broken at a junction with the gate scanning line, and the broken parts are bridged together through the second transparent electrode.

14. The method according to claim 11, comprising:

providing a substrate;

forming the gate scanning lines, gate electrodes of TFTs and the metal driving electrodes on the substrate;

forming a gate insulating layer on the substrate with the gate scanning lines, the gate electrodes of the TFTs and the metal driving electrodes;

forming the common electrodes and the second transparent electrodes on the substrate with the gate insulating layer, the common electrode being connected to the metal driving electrode through a via-hole in the gate insulating layer, the metal driving electrode and the gate scanning line being arranged in a crisscross manner, the meal driving electrode being broken at the junction with the gate scanning line, and the broken parts being bridged together through the second transparent electrode;

forming an insulating layer on the substrate with the common electrodes;

forming an active layer of the TFTs on the substrate with the insulating layer;

forming the data lines, source electrodes and drain electrodes of the TFTs, and the touch sensing electrodes on the substrate with the active layer;

forming a protection layer on the substrate with the data lines, the source electrodes and the drain electrodes of the TFTs, and the touch sensing electrodes; and forming the pixel electrodes and the pixel electrode materials on the substrate with the protection layer, the touch sensing electrode and the data line being arranged in a crisscross manner, the touch sensing electrode being broken at the junction with the data line, and the broken parts being bridged together through the pixel electrode material.

* * * * *